United States Patent [19]

Yule

[11] 4,049,162
[45] Sept. 20, 1977

[54] METERING VALVE
[76] Inventor: Lance S. Yule, P.O. Box 324, Ogunquit, Maine 03907
[21] Appl. No.: 664,318
[22] Filed: Mar. 5, 1976
[51] Int. Cl.² .......................................... B65D 47/00
[52] U.S. Cl. .................................. 222/476; 222/477; 222/517
[58] Field of Search ............... 222/477, 442, 449, 425, 222/476, 517, 67; 137/433, 43

[56] References Cited
U.S. PATENT DOCUMENTS

| 726,545 | 4/1903 | Langstaff | 222/477 X |
|---|---|---|---|
| 2,432,923 | 12/1947 | Newman | 222/477 X |
| 2,873,050 | 2/1959 | Halverson | 222/449 X |

Primary Examiner—Robert B. Reeves
Assistant Examiner—John P. Shannon
Attorney, Agent, or Firm—W. R. Hulbert

[57] ABSTRACT

A liquid dispenser metering valve, particularly for dispensing measured amounts of liquids from bottles, having a floatable ball in a metering chamber, a valve seat at the valve outlet on which the ball can seat, a biased normally closed cover extending over the outlet, a lever connected to the cover for actuating the cover to an open position, and a vent tube open to atmosphere at the valve housing and extending to the bottom of the liquid container to which the valve is connected.

5 Claims, 4 Drawing Figures

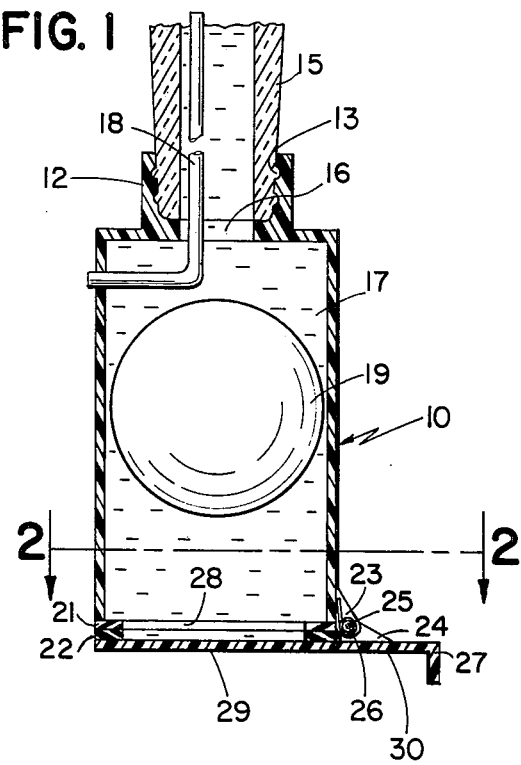
FIG. 1
FIG. 2
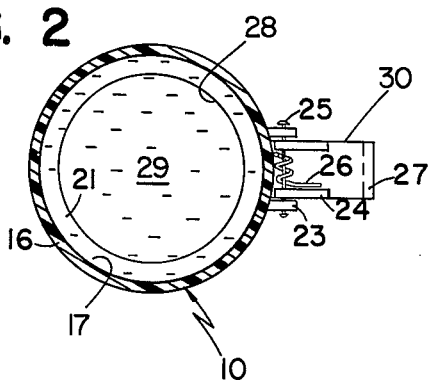
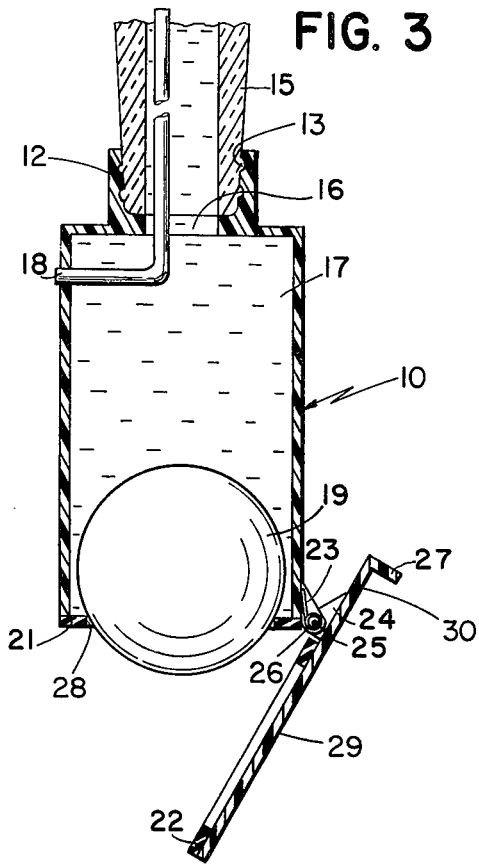
FIG. 3
FIG. 4
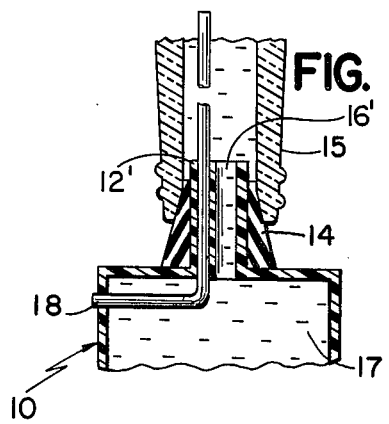

METERING VALVE

This invention relates to liquid dispenser metering valves and more particularly to such a valve adapted to dispense a predetermined quantity of a liquid.

It is a principal object of this invention to provide a simple and inexpensively constructed metering valve for dispensing measured quantities of liquid. It is a further object of this invention to provide such a valve which is operationally simple.

In general, the invention features a housing defining a metering chamber therewithin and having a liquid inlet and a liquid outlet communicating therethrough with the chamber. A ball which will float in the liquid to be dispensed is located in the chamber. At the outlet, a valve seat is provided for the ball defining an aperture having a diameter smaller than that of the ball. A cover is pivotally connected to the housing adjacent the outlet for opening and closing the outlet and biasing means are connected to the cover to maintain the cover in a normally closed position. Lever means connected to the cover extend beyond the pivotal connection of the cover to the housing for actuation to open the cover. A vent tube open to atmosphere at the housing extends through the housing and the inlet to a position adapted to reach the bottom of the liquid container.

In preferred embodiments, the aperture in the valve seat is sufficiently large and has a thickness sufficiently thin that the ball can extend partially therethrough. A sealing gasket is also preferably connected to the cover on the side adjacent the valve seat aperture. Finally, the metering chamber is preferably tubular, the inlet and outlet are axially aligned at opposite ends of the chamber and the vent tube extends through the side of the housing.

Other objects, features and advantages of the invention will be apparent to those skilled in the art from the following detailed description of a preferred embodiment thereof taken together with the accompanying drawings, in which:

FIG. 1 is a sectional view in elevation of a metering valve according to the invention in one operational position connected to a bottle;

FIG. 2 is a sectional view taken along the line 2—2 of FIG. 1;

FIG. 3 is a view of the valve of FIG. 1 in its other operational position; and

FIG. 4 is a fragmentary view similar to that of FIG. 1 showing a portion of an alternate embodiment.

Referring now to FIGS. 1 and 2, the valve according to the invention comprises a housing 10 defining a metering chamber 17 of predetermined volume. Chamber 17 is cylindrical.

A liquid inlet 16 opens through housing 10 to chamber 17 at one end thereof. As shown in FIGS. 1 and 3, housing 10 is adapted for connection to the opening of a bottle 15 at inlet 16 by the provision of a neck 12 having an internal thread 13 to engage the thread normally formed in the bottle to receive a cap.

At the other end of the housing 10, a liquid outlet is provided. A valve seat 21 is connected to housing 10 and defines the outlet aperture 28. A cover 29 is hingedly connected to the housing by pin 25 extending through hinge members 23 and 24 on the housing 10 and cover 29. The cover 29 extends across aperture 28 and is preferably provided with rubber ring seal 22 adhesively secured thereto to overlie and seal valve seat 21.

Spring 26 biases cover 29 to a closed position over aperture 28. A lever 30, integral with cover 29, extends beyond the hinge connection of cover 29 to housing 10 and preferably includes an upstanding lip 27 thereon.

As illustrated, the chamber 17 is longer than its diameter and inlet 16 and aperture 28 are of reduced diameter and are axially aligned at opposite end thereof. A floatable ball 19 is positioned within the chamber 17 having a diameter substantially the same as the chamber diameter, a small clearance being provided to permit liquid to pass thereby. Aperture 28 is smaller than ball 19, whereby ball 19 can seal against valve seat 28. The aperture diameter is sufficiently large, however, and the valve seat is sufficiently thin, as to permit ball 19 to extend partially therethrough when seated, as shown in FIG. 3.

A vent tube 18 open at each end is provided, extending from housing 10 through the inlet 16 and has a length sufficient to reach the bottom of the bottle with which it is to be used. The vent tube 18 in the embodiment illustrated in FIGS. 1 and 3 extends from the inlet 16 through chamber 17 and has an open end extending through a side of housing 10.

In the alternate embodiment illustrated in FIG. 4, the housing is provided with a neck 12' adapted to fit within the bottle opening and has a tapered rubber sleeve 14 thereabout to act as a stopper.

With the exception of spring 26, pin 25, seal 22 and optional sleeve 14, the valve parts are preferably constructed of plastic material.

In operation, as a bottle is inverted, chamber 17 fills with liquid and the ball 19 floats therein. Lever 30 is then engaged, e.g., against the edge of a glass (not shown) and is depressed to open cover 29. The liquid under the ball 19 is thus dispensed and the liquid flow and pressure differential move the ball down until it seats on valve seat 21, as shown in FIG. 3, where the pressure differential maintains it in a seated position. Air admitted through vent tube 18 permits a smooth flow and prevents a vacuum buildup in the bottle. Thus, a predetermined amount of liquid is dispensed. When lever 30 is released, spring 26 closes cover 29 which strikes and dislodges the ball 19 to permit the cycle to be repeated. The specific gravity of the ball 19 relative to the liquid is selected so that the ball will move downward with the liquid flow and will remain seated until dislodged by the cover 29.

Other embodiments of this invention will occur to those skilled in the art which are within the scope of the following claims.

What is claimed is:

1. A liquid dispenser metering valve comprising:
   a housing defining a metering chamber therein, a liquid inlet communicating therethrough with said chamber and adapted for connection to a liquid container adjacent its opening, and a liquid outlet communicating therethrough with said chamber;
   a ball in said chamber floatable in liquid to be dispensed therefrom;
   a valve seat for said ball at said outlet, defining an aperture having a diameter smaller than that of said ball;
   a cover pivotally connected to said housing adjacent said outlet adapted to open and close said aperture;
   biasing means connected to said cover biasing said cover to a normally closed position;
   lever means connected to said cover and extending therefrom beyond the pivotal connection thereof to said housing, adapted for actuation to open said cover; and a vent tube having an opening at each end, extending from said housing through said inlet and having a length sufficient to place one end adjacent the bottom of said liquid container, said tube also extending through said housing for establishing a vent to atmosphere at its other end.

2. The liquid dispenser metering valve claimed in claim 1 in which said aperture has a diameter sufficiently large and said valve seat has a thickness sufficiently thin to permit said ball to extend partially therethrough.

3. The liquid dispenser metering valve claimed in claim 1 in which said cover has a sealing gasket connected thereto on the side adjacent said aperture.

4. The liquid dispenser metering valve claimed in claim 1 in which said chamber is tubular and said inlet and outlet are axially aligned at opposite ends of said chamber.

5. The liquid dispenser metering valve claimed in claim 4 in which said other end of said vent tube extends through the side of said housing.

* * * * *